United States Patent [19]

McDaniel

[11] Patent Number: 4,644,019
[45] Date of Patent: Feb. 17, 1987

[54] MODIFIED TEREPHTHALIC ESTER POLYOLS AND RIGID FOAMS THEREFROM

[75] Inventor: Kenneth G. McDaniel, Austin, Tex.

[73] Assignee: Texaco Inc., White Plains, N.Y.

[21] Appl. No.: 791,679

[22] Filed: Oct. 28, 1985

[51] Int. Cl.[4] .................... C08G 18/14; C08G 18/16; C08G 18/32; C08G 18/34

[52] U.S. Cl. .................... 521/173; 252/182; 521/123; 521/124; 521/125; 521/126; 521/127; 521/128; 521/129; 521/172; 521/902

[58] Field of Search .................. 521/902, 172, 173; 252/182

[56] References Cited

U.S. PATENT DOCUMENTS

| | | | |
|---|---|---|---|
| 3,647,759 | 3/1972 | Walker | 260/75 R |
| 4,039,487 | 8/1977 | Kolakowski et al. | 260/2.5 AW |
| 4,048,104 | 9/1977 | Svoboda et al. | 521/173 |
| 4,092,276 | 5/1978 | Narayan | 260/2.5 AB |
| 4,223,068 | 9/1980 | Satterly et al. | 521/172 |
| 4,237,238 | 12/1980 | DeGuiseppi | 521/131 |
| 4,246,364 | 1/1981 | Koehler et al. | 521/167 |
| 4,246,365 | 1/1981 | Wiedermann et al. | 521/172 |
| 4,469,823 | 9/1984 | Yeakey et al. | 521/173 |
| 4,469,824 | 9/1984 | Grigsby et al. | 521/173 |
| 4,485,196 | 11/1984 | Speranza et al. | 521/173 |
| 4,540,768 | 9/1985 | Speranza et al. | 521/173 |
| 4,595,711 | 6/1986 | Wood | 521/173 |

Primary Examiner—Herbert S. Cockeram
Attorney, Agent, or Firm—Jack H. Park; Kenneth R. Priem; Richard A. Morgan

[57] ABSTRACT

The preparation of isocyanurate foams from a recycled polyethylene terephthalate polyol modified with a polyethoxylated nonylphenol is disclosed. These modified foams exhibit improved fluorocarbon solubility. The foams may be used for building roofing and sheathing applications.

17 Claims, No Drawings

MODIFIED TEREPHTHALIC ESTER POLYOLS AND RIGID FOAMS THEREFROM

BACKGROUND OF THE INVENTION

1. Field of the Invention

The invention relates to modified terephthalic ester polyols useful in preparing rigid polyurethane and polyisocyanurate foams. More particularly, the invention is a mixture of terephthalic ester based polyols modified with an ethoxylated alkylphenol.

2. Description of Other Relevant Compounds in the Field

It is known to prepare polyurethane foam by the reaction of polyisocyanate, a polyol and a blowing agent such as a halogenated hydrocarbon, water or both, in the presence of a catalyst. One particular area of polyurethane technology is based on rigid polyurethane foams.

U.S. Pat. No. 4,469,824 (Grisby, et al.) issued Sept. 4, 1984 describes polyols produced by reacting scrap polyethylene terephthalate (PET) with diethylene glycol and one or more oxyalkylene glycols and stripping out some of the ethylene glycol present. The mole ratio of glycols to scrap PET is greater than 1.2:1. These polyols are reacted with a polyisocyanate to produce polyurethane foams.

Rigid foams generally have good insulative properties and are thus desirable for use in building insulation. As with all building materials, it is desirable to provide rigid foams that are as fire resistant as possible. One approach to this goal is to modify the polyol.

Polyisocyanurate foams are a type which are considered to be fire resistant and show low smoke evolution on burning. However, polyisocyanurate foams tend to be brittle or friable. Various types of polyols have been devised to lower the foam friability, but what frequently happens is that the fire and smoke properties of the polyisocyanurate foam deteriorate. Thus, a fine balance exists between the amount and type of polyol one adds to a polyisocyanurate foam formulation in order to maintain maximum flame and smoke resistance while at the same time reach an improvement in foam friability. U.S. Pat. Nos. 4,039,487 and 4,092,276 describe attempts at this fine balance, although each has its disadvantages.

Scrap polyalkylene terephthalate, such as polyethylene terephthalate (PET) is known to be incorporated into polyurethanes. For example, U.S. Pat. No. 4,048,104 teaches that polyisocyanate prepolymers for use in polyurethane products may be prepared by combining an organic polyisocyanate with polyols which are the hydroxyl-terminated digestion products of waste polyalkylene terephthalate polymers and organic polyols. A polyol ingredient which is the digestion product of polyalkylene terephthalate residues or scraps digested with organic polyols is also described in U.S. Pat. No. 4,223,068. Another example where terephthalic acid residues are employed is outlined in U.S. Pat. No. 4,246,365 where polyurethanes are made from polyesters containing at least two hydroxyl groups and terephthalic acid residues.

In U.S. Pat. No. 4,237,238 a polyol mixture is prepared by the transesterification of a residue from the manufacture of dimethyl terephthalate with a glycol, which is then used to produce polyisocyanurate foams having a combination of a high degree of fire resistance with low smoke evolution, low foam friability and high compressive strength. The preparation of such a polyol mixture (from ethylene glycol and dimethyl terephthalate esterified oxidate residue) is described in U.S. Pat. No. 3,647,759. J. M. Hughes and John Clinton, in the Proceedings of the S.P.I. 25th Annual Urethane Division Technical Conference, Scottsdale, Ariz. (October 1979), describe other foams prepared from the polyols of U.S. Pat. No. 3,647,759.

Another type of polyisocyanurate foam employs a polyol blend using both amide diols and primary hydroxyl polyols to give a foam having a high reaction exotherm, making it particularly suited to the preparation of polyisocyanurate foam laminates, according to U.S. Pat. No. 4,246,364.

SUMMARY OF THE INVENTION

The invention is a mixture of modified terephthalic ester polyols which are useful by themselves or as extender polyols in preparing rigid foams. The mixtures are made by reacting recycled polyethylene terephthalate (PET) with diethylene glycol and at least one or more oxyalkylene glycols and a 1 to 20 preferably 2 to 10 molar ethoxylate of an alkylphenol wherein the alkyl is from 8 to 18 preferably 9 to 12 carbon atoms.

DETAILED DESCRIPTION OF THE PREFERRED EMBODIMENTS

It has been discovered that rigid foams may be made using the mixture of modified terephthalic ester polyols of this invention either alone or as polyol extender together with other polyols. These modified terephthalic ester polyols are reacted in the presence of a blowing agent and a catalyst, with an organic polyisocyanate to form foams which exhibit physical properties which make them useful for applications such as isocyanurate panels for roofing applications and sheathing building applications. These polyols are noted for their fluorocarbon solubility.

The novel modified terephthalic ester polyols are made by using recycled polyethylene terephthalate (PET). This may be any scrap residue from old polyethylene terephthalate which contains compounds having the moiety:

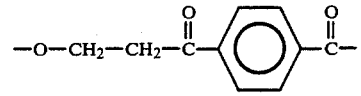

Generally, the scrap or recycled polyethylene terephthalate may be in any particulate form. A frequently seen form is fragmentized soft drink bottles which appear as clear or colored chips. Polyethylene film can also be recycled. Any chopping or pulverizing process which produces small bits of solid PET from the larger, waste recycled article would be appropriate to produce scrap PET useful herein. Sometimes the scrap PET is mixed with a solvent to make a kind of slurry. While scrap PET slurry could be used in the method of this invention, the recycled PET chips without the solvent is also useful.

The recycled PET is simultaneously or in either order reacted with ethoxylated alkylphenol and boiling oxyalkylene glycols. Reaction with oxyalkylene glycols forms low molecular weight dihydroxy esters of terephthalic acid. Ordinarily, these diesters are quite crystalline and separate from solution as solids. Of course, the preferred products are the aromatic polyester polyol-type compounds.

Preferably, the oxyalkylene glycol has the formula

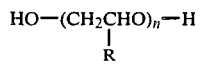

where R is hydrogen or lower alkyl of one to four carbon atoms and n is from 2 to 10. The glycol may be a residue or a flash-separated glycol. Glycols which meet this definition are diethylene glycol (DEG), dipropylene glycol, triethylene glycol (TEG), tripropylene glycol and tetrapropylene glycol, among others.

It is preferred that DEG be one of the oxyalkylene glycol reactants. Another oxyalkylene glycol be present as a co-reactant to help prevent the solids from settling out. Any single oxyalkylene glycol or mixture thereof can be used as the additional co-reactant with the DEG. These may include propylene glycol and higher molecular weight ethylene glycols, but not monoethylene glycol which is already present in the PET scrap residue in excess and must be stripped from the reaction mixture. Homogeneous polyesters have been prepared with dipropylene glycol without any diethylene glycol. Although exact proportions of these oxyalkylene glycols is not important, it is preferred that the DEG portion be the largest of the oxyalkylene glycol proportions.

It is preferred that the mole ratio of all of the glycols to PET scrap is greater than 1.2:1. It has been shown (e.g. U.S. Pat. No. 4,469,824 issued Sept. 4, 1984, Grigsby, Jr. et al. incorporated herein by reference) that when this reactant mole ratio is equal to or less than 1.2:1; solids come out of the mixture after it is left standing.

The third important feature of the process for making the mixtures of this invention is the stripping of ethylene glycol (EG) during the reaction. The EG is derived from the PET during the reaction and contributes to the creation of the solids which tend to precipitate out when the mixtures are left standing. Preferably, at least 5 wt % of the charge (the reactants) should be taken out as overhead, and at least 25 wt % of this overhead is EG. It is especially preferred that 15 to 25 wt % of the charge is stripped out as overhead, and most preferably, 17 to 20 wt % as overhead.

The temperature of the preparation process should be from 190° to 280° C. Preferably, the temperature runs from about 210° to 245° C. The pressure should generally range from atmospheric or below to 40 atmospheres, preferably from 1 to 20 atmospheres. No catalyst is necessary for this preparation. The mixture of terephthalic ester polyols should have a hydroxyl number in the range from 100 to 500, with an especially preferred range between 200 and 400.

The functionality of the product may be increased by including one or more additives into the reaction to make the terephthalic ester polyol mixtures. Such additives include alpha-methyl glucoside (AMG), glycerine, triethanolamine, diethanolamine, sorbitol and the like. Typically, the additive is present in an amount ranging from about 1 to 5 wt % based on the total reactant charge, although larger proportions could be used. It was found that use of excess glycerine tended to cause the undesirable precipitation of solids. If glycerine is used as a functionality-enhancing additive, it should be used in proportions up to about 10 wt %.

The terephthalic ester polyol mixture is modified by reaction as previously stated with about 5 wt % to 50 wt % preferably 10 wt % to 25 wt % of a 1 to 20 preferably 2 to 10 molar ethoxylate of alkylphenol to form a mixture of modified terephthalic ester polyols.

These modified ester polyol mixtures can serve as polyol extenders when they are blended with conventional polyols for use in polyurethane foams. The polyols of this invention can also be used alone to prepare isocyanurate foams.

There is good compatibility of the ester polyols of this invention with trichlorofluoromethane. Trichlorofluoromethane, sold under the tradename Freon ® R-11B, a conventional blowing agent, is the gas entrapped in closed-cell rigid foams which accounts for the excellent insulating properties of these foams.

The second constituent of the overall polyol combination found particularly useful in preparing rigid polyurethane foams is a polyether polyol having a hydroxyl number of 200 to 800. Usually the polyether polyol comprises 0 to 95 percent by weight of the total polyol combination weight. Preferred polyether polyols of this type are the reaction products of a polyfunctional active hydrogen initiator and propylene oxide, ethylene oxide or mixed propylene oxide and ethylene oxide. The polyfunctional active hydrogen initiator most preferably has a functionality of 2 to 8.

A wide variety of initiators may be alkoxylated to form useful polyether polyols. Thus, for example, polyfunctional amines and alcohols of the following type may be alkoxylated: monoethanolamine, diethanolamine, triethanolamine, ethylene glycol, polyethylene glycol, propylene glycol, polypropylene glycol, glycerine, sorbitol, trimethylolpropane, sucrose and alphamethyl glucoside.

Such above amines or alcohols may be reacted with an alkylene oxide such as ethylene oxide, propylene oxide or mixed ethylene oxide and propylene oxide using techniques known to those skilled in the art. Thus, for example, the reaction of alkylene oxide with initiators of this type is set forth in U.S. Pat. Nos. 2,948,757 and 3,000,963. Essentially such alkoxylations are carried out in the presence of a basic catalyst at a temperature sufficient to sustain the reaction. The hydroxyl number which is desired for the finished polyol would determine the amount of alkylene oxide used to react with the initiator. As noted above, the polyether polyols useful here have a hydroxyl number ranging from about 200 to about 800. The reaction mixture is then neutralized and water and excess reactants are stripped from the polyol. The polyether polyol may be prepared by reacting the initiator with propylene oxide or ethylene oxide or by reacting the initiator first with propylene oxide followed by ethylene oxide or vice versa in one or more sequences to give a so-called block polymer chain or by reacting the initiator at once with propylene oxide and ethylene oxide mixture to achieve a random distribution of such alkylene oxides.

Especially preferred as the second polyol constituent are the nitrogen-containing polyether polyols described in U.S. Pat. Nos. 3,297,597 and 4,137,265, incorporated by reference herein. These particularly preferred polyols are marketed by Texaco Chemical Company as Thanol ® R-350-X and Thanol ® R-650-X polyols. These polyols are prepared by reacting from 2 to 3 moles of propylene oxide with one mole of the Mannich reaction product of a mole of phenol or nonylphenol with one or two moles of diethanolamine and formaldehyde.

The final polyol combination for polyurethane foams comprises 0 to 95 percent by weight of said polyether polyol and 100 to 5 percent by weight of terephthalic ester polyol mixtures of this invention. Although the liquid terephthalic ester polyols of this invention may be used alone, it is preferred that they be present in an amount of from 30 to 70 wt % of the polyol blend. For isocyanurate foams, the liquid terephthalic ester polyol is used alone or together with blends of polyester polyols and polyether polyols. The polyol combination in many instances has a total hydroxyl number ranging from about 100 to about 500.

Any aromatic polyisocyanate may be used in the practice of the instant invention. Typical aromatic polyisocyanates include m-phenylene diisocyanate, p-phenylene diisocyanate, polymethylene polyphenylisocyanate, 2,4-toluene diisocyanate, 2,6-toluene diisocyanate, dianisidine diisocyanate, bitolylene diisocyanate, naphthalene-1,4-diisocyanate, diphenylene-4,4′-diisocyanate, aliphatic-aromatic diisocyanates, such as xylylene-1,4-diisocyanate, xylylene-1,2-diisocyanate, xylylene-1,3-diisocyanate, bis(4-isocyanatophenyl)methane, bis(3-methyl-4-isocyanatophenyl)methane, and 4,4′-diphenylpropane diisocyanate.

Greatly preferred aromatic polyisocyanates used in the practice of the invention are methylene-bridged polyphenyl polyisocyanate mixtures which have a functionality of from about 2 to about 4. These latter isocyanate compounds are generally produced by the phosgenation of corresponding methylene bridged polyphenyl polyamines, which are conventionally produced by the reaction of formaldehyde and primary aromatic amines, such as aniline, in the presence of hydrochloric acid and/or other acidic catalysts. Known processes for preparing the methylene-bridged polyphenyl polyamines and corresponding methylene-bridged polyphenyl polyisocyanates therefrom are described in the literature and in many patents; for example, U.S. Pat. Nos. 2,683,730; 2,950,263; 3,012,008; 3,344,162; and 3,362,979.

Most preferred methylene-bridged polyphenyl polyisocyanate mixtures used here contain from about 20 to about 100 wt % methylene diphenyl diisocyanate isomers with the remainder being polymethylene polyphenyl diisocyanates having higher functionalities and higher molecular weights. Typical of these are polyphenyl polyisocyanate mixtures containing about 20 to 100 wt % methylene diphenyl diisocyanate isomers, of which 20 to about 95 wt % thereof is the 4,4′-isomer with the remainder being polymethylene polyphenyl polyisocyanates of higher molecular weight and functionality that have an average functionality of from about 2.1 to about 3.5. The isocyanate mixtures are known commercially available materials and can be prepared by the process described in U.S. Pat. No. 3,362,979, issued Jan. 9, 1968 to Floyd E. Bentley.

In the production of rigid polyurethane foams in the practice of the invention, other known additives are necessary. One such constituent is the blowing agent. Some examples of such material are trichloromonofluoromethane, dichlorodifluoromethane, dichloromonofluoromethane, 1,1-dichloro-1-fluoroethane, 1,1-difluoro-1,2,2-trichloroethane, chloropentafluoroethane, and the like. Other useful blowing agents include low-boiling hydrocarbons such as butane, pentane, hexane, cyclohexane, and the like. See U.S. Pat. No. 3,072,582, for example. The polyols of this invention are quite compatible with fluorocarbon blowing agents unlike some of the prior art polyols which are made from PET residues.

Surfactant agents, better known as silicone oils, are added to serve as a cell stabilizer. Some representative materials are sold under the names of L-5420, L-521 and DC-193 which are, generally, polysiloxane polyoxyalkylene blocked copolymers, such as those disclosed in U.S. Pat. Nos. 2,834,748; 2,917,480; and 2,846,458, for example.

The catalysts which may be used to make the foams of this invention are well known. There are two general types of catalyst, tertiary amines and organometallic compounds. Examples of suitable tertiary amines, used either individually or in mixture, are the N-alkylmorpholines, N-alkylalkanolamines, N,N-dialkylcyclohexylamines and alkylamines where the alkyl groups are methyl, ethyl, propyl, butyl, etc. Examples of specific tertiary amine catalysts useful in this invention are triethylenediamine, tetramethylethylenediamine, triethylamine, tripropylamine, tributylamine, triamylamine, pyridine, quinoline, dimethylpiperazine, dimethylhexahydroaniline, piperazine, N-ethylmorpholine, 2-methylpiperazine, dimethylaniline, nicotine, dimethylaminoethanol, tetramethylpropanediamine and methyltriethylenediamine. Useful organometallic compounds are catalysts include those of bismuth, lead, tin, titanium, iron, antimony, uranium, cadmium, cobalt, thorium, aluminum, mercury, zinc, nickel, cerium, molybdenum, vanadium, copper, manganese, zirconium, etc. Some examples of these metal catalysts include bismuth nitrate, lead 2-ethylhexoate, lead benzoate, lead oleate, dibutyltin dilaurate, tributyltin, butyltin trichloride, stannic chloride, stannous octoate, stannous oleate, dibutyltin di(2-ethylhexoate), ferric chloride, antimony trichloride, antimony glycolate, tin glycolates, etc. Selection of the individual catalysts and proportions to use in the polyurethane reaction are well within the knowledge of those skilled in the art, and an amine and organometallic compound are often used together in the polyurethane reaction.

Catalysts particularly useful for isocyanurate foams include salts of organic acids such as sodium acetate, potassium octoate, tetramethyl ammonium formate, tetramethyl ammonium octoate, and tridimethyl aminomethyl phenol.

The rigid polyurethane foams prepared here can be made in one step by reacting all the ingredients together at once (one-shot process) or the rigid foams can be made by the so-called "quasi-prepolymer method." In accordance with this method, a portion of the polyol component is reacted in the absence of a catalyst with the polyisocyanate component in proportion so as to provide from about 20 percent to about 40 percent of free isocyanate groups in the reaction product, based on the polyol. To prepare foam, the remaining portion of the polyol is added and, the two components are allowed to react in the presence of a catalyst and other appropriate additives such as blowing agents, foam stabilizing agents, fire retardants, etc. The blowing agent, the foam stabilizing agent, the fire retardant, etc., may be added to either the prepolymer or remaining polyol, or both, prior to the mixing of the component whereby at the end of the reaction a rigid polyurethane foam is provided.

In one embodiment the amount of polyol combination is used such that the isocyanate groups are present in the foam in at least an equivalent amount, and preferably in slight excess, compared with the free hydroxyl groups. Preferably, the ingredients will be proportional so as to provide for about 1.05 to about 8.0 mole equivalents of isocyanate groups per mole equivalent of hydroxyl groups.

In another embodiment used for making packaging foams, the equivalents of isocyanate to equivalents of hydroxyl groups may be as low as 0.2.

The invention will be illustrated further with respect to the following specific examples, which are given by way of illustration and not given as limitations on the scope of this invention.

EXAMPLE I

Ethoxylates of nonylphenol were used to improve the fluorocarbon compatibility of polyethylene terephthalate based urethane and isocyanurate foams.

Polyester Synthesis

The apparatus consisted of a one liter three neck flask equipped with a mechanical stirrer, reflux condenser, thermometer, heating mantle, and temperature controller. Surfonic® N-31.5 (140 g) and a polyester (560 g) were charged to the flask and was heated to 200° C. for one hour. The polyester had been prepared by the reaction of polyethylene terephthalate with diethylene glycol and dipropylene glycol and with the removal of approximately 50 percent of the ethylene glycol contained in the polyethylene terephthalate. The analyses of the product polyester are as follows:

OH No.=239 mg KOH/g polyester, viscosity=9100 cps at 25° C., and acid number=1.28 mg KOH/g polyester.

The product polyester 5871-71-1 was tested for fluorocarbon solubility by mixing polyester and Freon® 11 and determining the maximum amount of fluorocarbon that can be used and still have a homogeneous solution. The maximum solubility was 37 percent fluorocarbon. This test was repeated using Surfonic® N-31.5 and starting material polyester in a ratio of 140 to 560. The fluorocarbon solubility of the mixture was 34 percent.

Several foams were prepared to show the usefulness of these modified polyesters.

A foam potentially useful for packaging foam was prepared as follows:

| Polyurethane Packaging Foam Formulation | |
|---|---|
| Thanol® SF 5505 | 16.7 |
| Thanol® R-650-X | 2.45 |
| Surfonic® N-120 | 7.5 |
| Polyester 5871-71-4 | 6.65 |
| Water | 6.7 |
| Thancat® DPA | 1.0 |
| Sil Wet® 711 | 0.5 |
| Freon® 11C Flourocarbon | 11.7 |
| Rubinate® M | 46.8 |

The packaging foam exhibited a reaction profile of cream=17 sec., gel=68 sec., tack free=86 sec., and rise=80 sec. A nonshrinking foam was obtained.

An isocyanurate foam was prepared and the foam quality was determined.

| Isocyanurate Foam Formulation | |
|---|---|
| 5871-71-4 | 16.7 |
| Silicone DC-193® | 0.8 |
| Potassium acetate (30% in diethylene glycol) | 0.6 |
| Curithane® 52 | 0.2 |
| Polycat® 8 | 0.2 |
| Fluorocarbon Freon® 11A | 14.5 |
| Papi® 27 | 53.47 |

| Physical Foam Properties | |
|---|---|
| Density, pcf | 1.75 |
| K-factor | 0.119 |
| Closed cells (%) | 94.5 |
| Δ V after 4 weeks at 158° F. and relative humidity = 100% | 13.2% |
| Butler Chimney weight retained | 83.5% |

| GLOSSARY | |
|---|---|
| Thanol® SF 5505 | 5500 molecular weight high reactivity triol - Texaco Chemical Co. |
| Thanol® R-650-X | A propoxylated Mannich condensate of nonylphenol formaldehyde and diethanolamine; according to U.S. Pat. No. 4,137,265 Texaco Chemical Co. |
| Surfonic® N-31.5 | The 3.15 molar ethoxylate of nonylphenol - Texaco Chemical Co. |
| Surfonic® N-120 | The 12 molar ethoxylate of nonylphenol. Texaco Chemical Co. |
| Potassium acetate | 30% solution in diethylene glycol |
| Polycat® 8 | Polyurethane amine catalyst; Abbot |
| Thancat® DPA | Two mole propylene oxide adduct of dimethylaminopropylamine; Texaco Chemical Co. |
| Sil Wet® 711 | A silicon surfactant; Union Carbide |
| Silicone DC-193®, | A silicone surfactant made by Dow-Corning Corp. |
| Curithane® 52 | Isocyanurate catalyst; The Upjohn Co. |
| Rubinate® M | Polymeric MDI isocyanate, Rubicon Chemicals, Inc. |
| PAPI® 27 | Polymeric isocyanate; The Upjohn Co. |

Many modifications may be made in the polyol mixtures of this invention and their method of production without departing from the spirit and scope of the invention which is defined only in the appended claims. For example, one skilled in the art could adjust the temperature, pressure, reactants, proportions and modes of additions to provide polyol mixtures that give foams with optimal properties.

What is claimed is:

1. A terephthalic ester polyol produced by reacting recycled polyethylene terephthalate with a 1 to 20 molar ethoxylate of an alkylphenol wherein the alkyl comprises from 8 to 18 carbon atoms.

2. The polyol of claim 1 wherein recycled polyethylene terephthalate is reacted with about 5 wt % to 50 wt % of ethoxylated alkylphenol wherein the alkyl comprises from 8 to 18 carbon atoms.

3. The polyol of claim 2 wherein the ethoxylated alkylphenol is in an amount of 10 wt % to 25 wt % and the alkyl is from about 9 to 12 carbon atoms.

4. A rigid foam obtained by reacting in the presence of a blowing agent and a catalyst of polyisocyanurate or polyurethane formation, an organic polyisocyanate and polyol component comprising the terephthalic ester polyol of claim 1.

5. A modified terephthalic ester polyol produced by reacting a recycled polyethylene terephthalate based polyol with about 5 to 50 wt % of a 1 to 20 molar ethoxylate of nonylphenol to form a modified terephthalic ester polyol.

6. The polyol of claim 5 wherein the recycled polyethylene terephthalate based polyol is reacted with about 10 wt % to 25 wt % of the 2 to 10 molar ethoxylate of nonylphenol.

7. A rigid foam obtained by reacting in the presence of a blowing agent and a catalyst of polyisocyanurate or polyurethane formation, an organic polyisocyanate and polyol component comprising the modified terephthalic ester polyol of claim 5.

8. A mixture of modified terephthalic ester polyols produced by reacting:
   a. recycled polyethylene terephthalate;
   b. an oxyalkylene glycol of the formula:

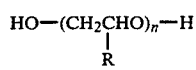

wherein R is hydrogen or alkyl of 1 to 4 carbon atoms and n ranges from 2 to 10;
   c. and about 5 to 50 wt % of a 1 to 20 molar ethoxylate of an alkylphenol wherein the alkyl is from 8 to 16 carbon atoms to form a mixture of modified terephthalic ester polyols.

9. The mixture of modified terephthalic ester polyols claim 8 produced by reacting about 10 wt % to 25 wt % of a 2 to 10 molar ethoxylate of nonylphenol.

10. A rigid foam obtained by reacting in the presence of a blowing agent and a catalyst of polyisocyanurate or polyurethane formation, an organic polyisocyanate and polyol component comprising the mixture of modified terephthalic ester polyols of claim 8.

11. A mixture of modified terephthalic ester polyols produced by:
   a. reacting recycled polyethylene terephthalate with diethylene glycol and at least one or more oxyalkylene glycol of the formula:

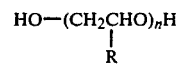

wherein R is hydrogen or alkyl of 1 to 4 carbon atoms and n ranges from 2 to 10, wherein the mole ratio of glycols to recycled polyethylene terephthalate is greater than 1.2:1;
   b. stripping off as overhead at least 5 wt % of the reaction product from step a. based on the reactants charged, where at least 25% of the overhead is ethylene glycol; to form a mixture of terephthalic ester polyols of average hydroxyl number between 100 and 500;
   c. reacting the mixture of terephthalic ester polyols with about 5 wt % to 50 wt % of a 1 to 20 molar ethoxylate of an alkylphenol wherein the alkyl is from 8 to 16 carbon atoms to form a mixture of modified terephthalic ester polyols.

12. The mixture of claim 11 wherein the mixture of terephthalic ester polyols is reacted with about 10 wt % to 25 wt % of a 2 to 10 molar ethoxylate of nonylphenol.

13. The mixture of claim 12 wherein in the ethoxylate of nonylphenol the ethoxylation averages from about 3 to 4.

14. The mixture of claim 12 wherein in the ethoxylate of nonylphenol the ethoxylation averages about 3.15.

15. The mixture of claim 11 wherein in step a. a functionality enhancing additive selected from the group consisting of alpha-methyl glucoside, triethanolamine, diethanolamine and glycerine is present during the reaction.

16. The mixture of claim 11 wherein in step a. alpha-methyl glucoside is present in an amount up to 10 wt % based on the total weight of reactants charged.

17. A rigid foam obtained by reacting in the presence of a blowing agent and a catalyst for polyisocyanurate or polyurethane formation, an organic polyisocyanate and polyol component comprising the mixture of modified terephthalic ester polyols of claim 11.

* * * * *